Hermann Tschochner
by his attorneys.
Howson and Howson.

Jan. 17, 1933.  H. TSCHOCHNER  1,894,899
METHOD AND APPARATUS FOR MACHINING ROLLS SUCH AS PILGER ROLLS AND THE LIKE
Filed Sept. 22, 1931   2 Sheets-Sheet 2

Hermann Tschochner
by his attorneys
Howson and Howson.

Patented Jan. 17, 1933

1,894,899

UNITED STATES PATENT OFFICE

HERMANN TSCHOCHNER, OF KOMOTAU, CZECHOSLOVAKIA

METHOD AND APPARATUS FOR MACHINING ROLLS SUCH AS PILGER ROLLS AND THE LIKE

Application filed September 22, 1931, Serial No. 564,440, and in Germany January 29, 1931.

The invention relates to a method and apparatus for machining rolls such as Pilger rolls and the like.

This invention comprises a method of machining rolls, for example Pilger rolls, which consists in (a) Rotating a pair of rolls having their axes disposed parallel to one another about an axis which extends between the rolls in a direction at right angles to the axes thereof (b) Subjecting the rolls as they rotate to cuts across the peripheral faces thereof from a tool located between the rolls, and (c) Periodically moving the tool radially with respect to the said axis of rotation of the pair of rolls in such a manner that the cuts are made in accordance with the desired contour of the rolls.

Apparatus for carrying the method into effect consists of a machine similar to a vertical turning and boring machine and in which a pair of rolls to be machined are mounted upon a rotatable table adjacent to one another with their axes parallel and so that the axis of rotation of the table is disposed in a plane at right angles to the axes of the rolls and is located at the central point of the rolling section formed between the adjacent surfaces of the rolls. The machining is effected by means of a tool located between the rolls to which different movements are imparted in order to produce the desired contour of the rolls, as, for example, the known contour of Pilger rolls or any other contour in which particular variations from a purely circular contour are required, the desired contour being automatically produced during the machining operations.

When the tool is stationary a purely circular cut is made on the rolls thereby as the table rotates. The tool is however, subjected to a number of periodical movements so as to produce the inclined surfaces on the rolling faces of the rolls and, if desired, to produce other variations from the purely circular form in the contour of the said rolling faces. The feeding of the work to the tool is effected by the necessary slight rotation of the rolls about their axes between successive cuts of the tool.

In order that the invention may be fully understood, reference is directed to the accompanying diagrammatic drawings, in which:—

Figure 1:
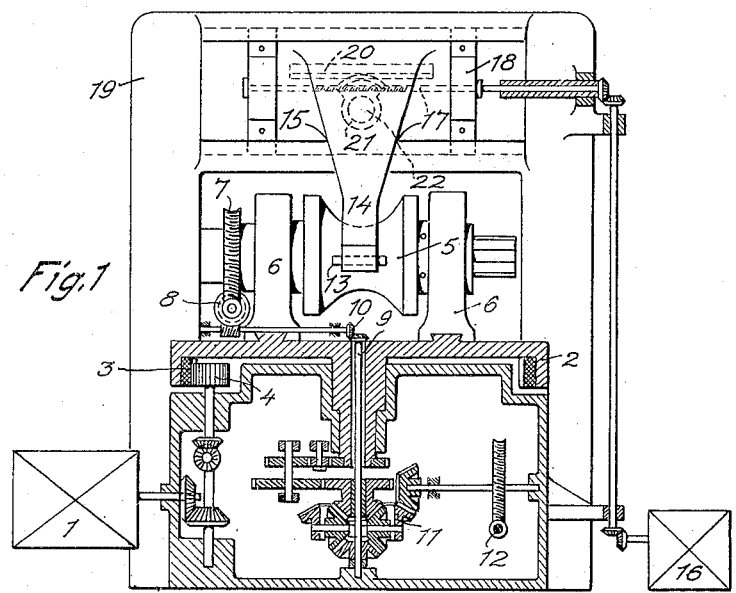
Figure 2:
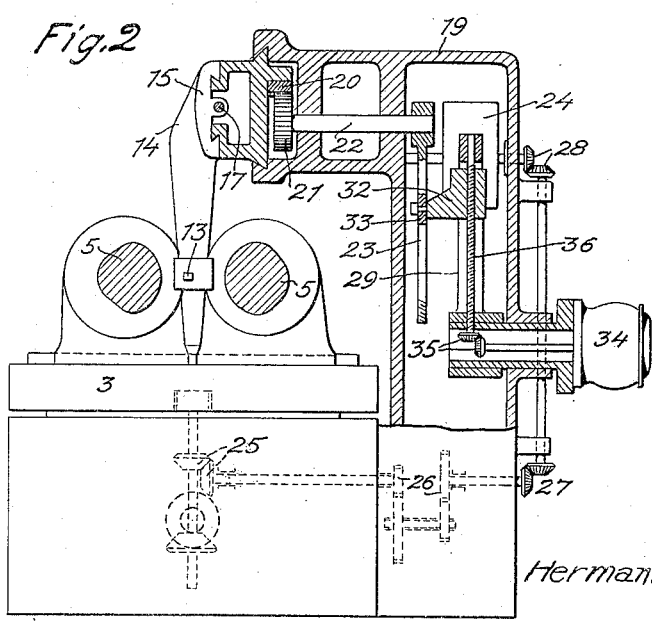
Figure 3:
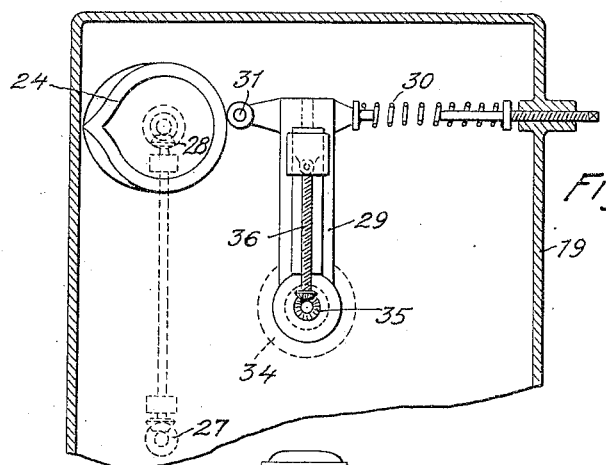
Figure 4:
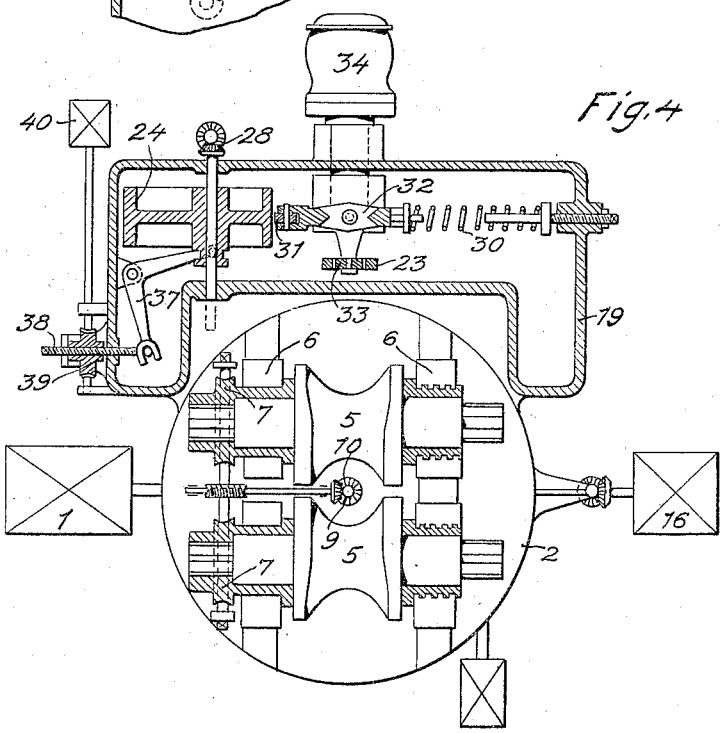

Figure 1 illustrates in sectional elevation a machine constructed for carrying the present invention into effect, with a work table of the machine and other adjacent parts illustrated in vertical section, Figure 2 is a sectional side elevation at right angles to Figure 1, Figure 3 is a vertical section through the upper rear portion of the machine, the section being at right angles to Figure 2, and Figure 4 is a sectional plan view of Figure 1.

Referring to the drawings, a table 2 is rotatably mounted in the frame of the machine and is provided with an inwardly directed ring of teeth 3 arranged in mesh with a pinion 4 which is operatively geared to a motor 1 for the purpose of rotating the table. A pair of Pilger rolls 5 are illustrated in the drawings as being mounted with their trunnions in bearings 6 secured to the table 2.

The bearings 6 are slidably arranged on the table 2 so that the rolls may be moved towards and away from one another in a direction transverse to their axes. These movements may be effected through the medium of slides on the bearings 6 and guides on the table 2 constructed in any convenient manner and actuated by a worm or like gear driven from an operating shaft. The rotative feed movement of the rolls 5 is effected through the medium of worm wheels 7 secured to the trunnions of the rolls, Figures 1 and 4, and worms 8 arranged in mesh therewith and connected by gearing to a horizontally disposed spindle which is in turn connected by bevel gears 10 to a vertically disposed spindle 9 arranged to extend through a vertical hole formed in the centre of the table 2. The spindle 9 is arranged to be driven through the medium of a differential gear 11 of known construction which is operatively coupled to a worm shaft 12.

The cutting tool 13 is carried by a tool holder 14 which extends between the rolls 5. The holder 14 is mounted upon a movable head 15 which is slidably mounted upon a carriage 18 which in turn is carried in horizontally disposed guides provided on the frame 19 of the machine. The holder and head may be integral as shown in the drawings or the holder may be mounted on the head in a conventional manner for example with screws. The head 15 is displaceable horizontally upon the carriage 18 by means of a feed screw 17 which is operatively connected by gearing to a driving motor 16. It will be appreciated that movements of the head 15 upon the carriage 18 effects variations in the effective cutting radius of the tool 13. The motor 16 may be controlled by known forms of servo apparatus and variations in the effective cutting radius of the tool 15 effected so as to produce variations in the contour of the rolls which are required in Pilger rolls such, for example, as are illustrated in cross-section in Figure 2.

The carriage 18 is provided with a horizontally disposed toothed rack 20, Figures 1 and 2, arranged in mesh with a toothed segment 21 mounted upon one end of a spindle 22 carried in bearings in the frame 19. The other end of the spindle 22 carries a forked lever 23 into the fork of which a roller 33 is arranged to extend which is mounted upon a block 32. The block 32 is secured to a vertically disposed screw threaded spindle 36 mounted upon a vertically disposed arm 29 which is pivotally mounted at its lower end to a bearing carried by the frame 19. The block 32 extends into a slot formed in the arm 29, and rotations of the spindle 36 cause the block 32 to be moved upwards or downwards relatively to the said arm 29. The spindle 36 is connected by bevel gears 35 to a driving motor 34 which is preferably controlled by a known form of servo apparatus so as to vary the position of the block 32 upon the arm 29. The arm 29 is provided at its upper end with a roller 31, Figures 3 and 4, which is arranged to be pressed against the surface of a drum 24 by a spring 30. The surface of the drum 24 is constructed so as to vary from a purely circular configuration at one end thereof to a cam surface at the other end thereof, the contour of which is indicated in Figure 3. The drum 24 is mounted upon a spindle carried in bearings in the frame 19 and is keyed to the said spindle so as to be rotatable therewith, whilst being axially displaceable thereon. The spindle of the drum is arranged to be rotated at twice the speed of the table 2 through the medium of transmission gears 27, 28.

Axial displacements of the drum 24 are effected through the medium of a coupling lever 37, a screw threaded spindle 38 operatively connected thereto and arranged in engagement with a nut 39 in the form of a worm wheel which is operatively connected to a driving motor 40. Rotation of the drum 24 during the machining operations of a pair of rolls causes the arm 29 to be rocked to an extent determined by the axial position of the drum 24 upon the spindle thereof and the rocking motion of the said arm is transmitted to the fork 23, to an extent dependent upon the vertical position of the block 32, and thence to the segment 21 thus effecting reciprocating movements of the carriage 18. These reciprocating movements of the carriage 18 are employed for controlling the movements of the tool 13 which produce the inclined side portions of the rolling surface of the rolls, and it will be appreciated that any desired inclination may be produced by the control of the vertical position of the block 32 and the axial position of the drum 24 which controls the commencement and termination of the oscillating movements of the arm 29.

I claim:

1. In a machine tool for machining rolls of the kind described, the combination of a rotatable table provided with bearings for supporting a pair of rolls to be machined with their axes parallel to one another and to said table, a tool holder carried on the frame of the machine and extending between the pair of rolls so mounted, means for rotating said table, mechanism for rotating each roll about its axis to feed the same to a tool in said holder and mechanism for automatically moving the tool holder in directions transverse to the axis of rotation of the table as the same rotates and for the purpose specified.

2. In a machine tool for machining rolls of the kind described, the combination of a rotatable table provided with bearings for supporting a pair of rolls to be machined with their axes parallel to one another and to said table, a tool holder movably mounted on the machine frame and extending between the pair of rolls so mounted, means for moving said tool holder radially with respect to said table, means for rotating said table, mechanism for rotating each roll about its axis to feed the same to a tool in said holder and mechanism for moving the tool holder in directions transverse to the axis of rotation of the table as the same rotates, and for the purpose specified.

3. In a machine tool for machining rolls of the type described, the combination of a rotatable table provided with bearings for supporting a pair of rolls to be machined with their axes parallel to one another and to said table, a tool holder movably carried on the frame of the machine and extending between the pair of rolls so mounted, means for rotating said table, mechanism for rotating each roll about its axis to feed the same to a tool in said holder, a rack operatively connected to said tool holder and arranged in mesh with an oscillatable toothed segment rigidly connected to an oscillatable lever and means for oscillating said lever for the purpose set forth.

4. In a machine tool for machining rolls of the type described, the combination of a rotatable table provided with bearings for supporting a pair of rolls to be machined with their axes parallel to one another and to said table, a tool holder movably carried by the frame of the machine and extending between the pair of rolls so mounted, means for rotating said table, mechanism for rotating each roll about its axis to feed the same to the tool, a rack operatively connected to said tool holder and arranged in mesh with an oscillatable toothed segment rigidly connected to an oscillatable lever, an operative connection between said lever and a rotatable cam for the purpose set forth.

5. In a machine tool for machining rolls of the type described, the combination of a rotatable table provided with bearings for supporting a pair of rolls to be machined with their axes parallel to one another and to said table, a tool holder movably carried by the frame of the machine and extending between the pair of rolls so mounted, means for rotating said table, mechanism for rotating each roll about its axis to feed the same to the tool, a rack operatively connected to said tool holder and arranged in mesh with an oscillatable toothed segment rigidly connected to an oscillatable lever, an operative connection between said lever and a rotatable cam drum, said cam drum being constructed of varying configuration axially thereof and means for moving said drum axially to vary the point of operative connection between the said drum and the said arm for the purpose set forth.

6. In a machine tool for machining rolls of the type described, the combination of a rotatable table provided with bearings for supporting a pair of rolls to be machined with their axes parallel to one another and to said table, a tool holder movably carried by the frame of the machine and extending between the pair of rolls so mounted, means for rotating said table, mechanism for rotating each roll about its axis to feed the same to the tool, a rack operatively connected to said tool holder and arranged in mesh with an oscillatable toothed segment rigidly connected to an oscillatable lever, an oscillatable arm normally arranged opposite and substantially parallel to said lever and extending in an opposite direction thereto, a connecting member between said lever and said arm, means for moving said member longitudinally of said lever and said arm, and an operative connection between said arm and a rotatable cam for the purpose specified.

7. In a machine tool for machining rolls of the type described, the combination of a rotatable table provided with bearings for supporting a pair of rolls to be machined with their axes parallel to one another and to said table, a tool holder movably carried by the frame of the machine and extending between the pair of rolls so mounted, means for rotating said table, mechanism for rotating each roll about its axis to feed the same to the tool, a rack operatively connected to said tool holder and arranged in mesh with an oscillatable toothed segment rigidly connected to an oscillatable lever, an oscillatable arm normally arranged opposite and substantially parallel to said lever and extending in an opposite direction thereto, a connecting member between said lever and said arm, means for moving said member longitudinally of said lever and said arm, an operative connection between said arm and a rotatable cam drum, said cam drum being constructed of varying configuration axially thereof and means for moving said drum axially to vary the point of operative connection between the said drum and the said arm for the purpose specified.

8. In a machine tool for machining rolls of the type described, the combination of a rotatable table provided with bearings for supporting a pair of rolls to be machined with their axes parallel to one another and to the said table, a carriage slidable on the machine frame, a tool holder movably mounted on said carriage and extending between the pair of rolls so mounted, means for moving said tool holder on said carriage, means for rotating said table, mechanism for rotating each roll about its axis to feed the same to a tool in said holder, a rack mounted on said carriage and arranged in mesh with an oscillatable toothed segment rigidly connected to an oscillatable lever and means for oscillating said lever for the purpose set forth.

9. In a machine tool for machining rolls of the type described, the combination of a rotatable table provided with bearings for supporting a pair of rolls to be machined with their axes parallel to one another and to the said table, a carriage slidable on the machine frame, a tool holder movably mounted on said carriage and extending between the pair of rolls so mounted, means for moving said tool holder on said carriage, means for rotating said table, mechanism for rotating each roll about its axis to feed the same to a tool in said holder, a rack mounted on said carriage and arranged in mesh with an oscillatable toothed segment rigidly connected to an oscillatable lever, an operative connection between said lever and a rotatable cam for the purpose set forth.

10. In a machine tool for machining rolls of the type described, the combination of a rotatable table provided with bearings for supporting a pair of rolls to be machined with their axes parallel to one another and to the said table, a carriage slidable on the machine frame, a tool holder movably mounted on said carriage and extending between the pair of rolls so mounted, means for moving said tool holder on said carriage, means for rotating said table, mechanism for rotating each roll about its axis to feed the same to a tool in said holder, a rack mounted on said carriage and arranged in mesh with an oscillatable toothed segment rigidly connected to an oscillatable lever, an operative connection between said lever and a rotatable cam drum, said cam drum being constructed of varying configuration axially thereof and means for moving said drum axially to vary the point of operative connection between the said drum and the said lever for the purpose set forth.

11. In a machine tool for machining rolls of the type described, the combination of a rotatable table provided with bearings for supporting a pair of rolls to be machined with their axes parallel to one another and to the said table, a carriage slidable on the machine frame, a tool holder movably mounted on said carriage and extending between the pair of rolls so mounted, means for moving said tool holder on said carriage, means for rotating said table, mechanism for rotating each roll about its axis to feed the same to a tool in said holder, a rack mounted on said carriage and arranged in mesh with an oscillatable toothed segment rigidly connected to an oscillatable lever, an oscillatable arm normally arranged opposite and substantially parallel to said lever and extending in an opposite direction thereto, a connecting member between said lever and said arm, means for moving said member longitudinally of said lever and said arm, and an operative connection between said arm and a rotatable cam arm, for the purpose specified.

12. In a machine tool for machining rolls of the type described, the combination of a rotatable table provided with bearings for supporting a pair of rolls to be machined with their axes parallel to one another and to the said table, a carriage slidable on the machine frame, a tool holder movably mounted on said carriage and extending between the pair of rolls so mounted, means for moving said tool holder on said carriage, means for rotating said table, mechanism for rotating each roll about its axis to feed the same to a tool in said holder, a rack mounted on said carriage and arranged in mesh with an oscillatable toothed segment rigidly connected to an oscillatable lever, an oscillatable arm normally arranged opposite and substantially parallel to said lever and extending in an opposite direction thereto, a connecting member between said lever and said arm, means for moving said member longitudinally of said lever and said arm, an operative connection between said arm and a rotatable cam drum, said cam drum being constructed of varying configuration axially thereof and means for moving said drum axially to vary the point of operative connection between the said drum and the said arm, for the purpose specified.

13. In a machine tool for machining rolls of the type described, the combination of a rotatable table provided with bearings for supporting a pair of rolls to be machined with their axes parallel to one another and to said table, a tool holder movably carried by the frame of the machine and extending between the pair of rolls so mounted, means for rotating said table, mechanism for rotating each roll about its axis to feed the same to the tool, a rack operatively connected to said tool holder and arranged in mesh with an oscillatable toothed segment rigidly connected to an oscillatable lever, an operative connection between said lever and a rotatable cam for the purpose set forth and a driving connection between said cam and said table.

14. In a machine tool for machining rolls of the type described, the combination of a rotatable table provided with bearings for supporting a pair of rolls to be machined with their axes parallel to one another and to said table, a tool holder movably carried by the frame of the machine and extending between the pair of rolls so mounted, means for rotating said table, mechanism for rotating each roll about its axis to feed the same to the tool, a rack operatively connected to said tool holder and arranged in mesh with an oscillatable toothed segment rigidly connected to an oscillatable lever, an operative connection between said lever and a rotatable cam drum, said cam drum being constructed of varying configuration axially thereof and means for moving said drum axially to vary the point of operative connection between the said drum and the said arm for the purpose set forth and a driving connection between said drum and said table for rotating said drum.

15. In a machine tool for machining rolls of the type described, the combination of a rotatable table provided with bearings for supporting a pair of rolls to be machined with their axes parallel to one another and to said table, a tool holder movably carried by the frame of the machine and extending between the pair of rolls so mounted, means for rotating said table, mechanism for rotating each roll about its axis to feed the same to the tool, a rack operatively connected to said tool holder and arranged in mesh with an oscillatable toothed segment rigidly connected to an oscillatable lever, an oscillatable arm normally arranged opposite and substantially parallel to said lever and extending in an opposite direction thereto, a connecting member between said lever and said arm, means for moving said member longitudinally of said lever and said arm, and an operative connection between said arm and a rotatable cam for the purpose specified and a driving connection between said cam and said table.

16. In a machine tool for machining rolls of the type described, the combination of a rotatable table provided with bearings for supporting a pair of rolls to be machined with their axes parallel to one another and to said table, a tool holder movably mounted on the machine frame and extending between the pair of rolls so mounted, feed mechanism for moving said tool holder radially with respect to said table, servo motor mechanism for actuating said feed mechanism, means for rotating said table, mechanism for rotating each roll about its axis to feed the same to a tool in said holder and mechanism for moving the tool holder in directions transverse to the axis of rotation of the table as the same rotates and for the purpose specified.

17. In a machine tool for machining rolls of the type described, the combination of a rotatable table provided with bearings for supporting a pair of rolls to be machined with their axes parallel to one another and to the said table, a carriage slidable on the machine frame, a tool holder movably mounted on said carriage and extending between the pair of rolls so mounted, means for moving said tool holder on said carriage, means for rotating said table, mechanism for rotating each roll about its axis to feed the same to a tool in said holder, a rack mounted on said carriage and arranged in mesh with an oscillatable toothed segment rigidly connected to an oscillatable lever, an oscillatable arm normally arranged opposite and substantially parallel to said lever and extending in an opposite direction thereto, a connecting member between said lever and said arm, feed mechanism for moving said member longitudinally of said lever and said arm, servo motor mechanism for actuating said feed mechanism and an operative connection between said arm and a rotatable cam for the purpose specified.

18. In a machine tool for machining rolls of the type described, the combination of a rotatable table, provided with bearings for supporting a pair of rolls to be machined with their axes parallel to one another and to the said table, a carriage slidable on the machine frame, a tool holder movably mounted on said carriage and extending between the pair of rolls so mounted, feed mechanism for moving said tool holder on said carriage, servo motor mechanism for actuating said feed mechanism, means for rotating said table, mechanism for rotating each roll about its axis to feed the same to a tool in said holder, a rack mounted on said carriage and arranged in mesh with an oscillatable toothed segment rigidly connected to an oscillatable lever, an oscillatable arm normally arranged opposite and substantially parallel to said lever and extending in an opposite direction thereto, a connecting member movable longitudinally between said lever and said arm, feed mechanism for moving said member longitudinally of said lever and said arm, servo motor mechanism for actuating said feed mechanism and an operative connection between said arm and a rotatable cam for the purpose specified.

19. A method of machining rolls, for example, Pilger rolls, which consists in (a) rotating a pair of rolls having their axes disposed parallel to one another about an axis which extends between the rolls in a direction at right angles to the axes thereof (b) subjecting the rolls as they rotate to cuts across the peripheral faces thereof from a tool located between the rolls, and (c) periodically moving the tool radially with respect to the said axis of rotation of the pair of rolls in such a manner that the cuts are made in accordance with the desired contour of the rolls.

In testimony whereof I have signed my name to this specification.

HERMANN TSCHOCHNER.

CERTIFICATE OF CORRECTION.

Patent No. 1,894,899.                                      January 17, 1933.

HERMANN TSCHOCHNER.

It is hereby certified that error appears in the printed specification of the above numbered patent requiring correction as follows: Page 3, line 69, claim 7, strike out the syllable and words "tion thereto, a connecting member" and insert instead "frame of the machine and extending": page 4, line 39, claim 11, strike out the word and comma "arm,"; and that the said Letters Patent should be read with these corrections therein that the same may conform to the record of the case in the Patent Office.

Signed and sealed this 28th day of February, A. D. 1933.

(Seal)

M. J. Moore,
Acting Commissioner of Patents.

DISCLAIMER 1,894,899.—*Hermann Tschochner*, Komotau, Czechoslovakia. METHOD AND APPARATUS FOR MACHINING ROLLS SUCH AS PILGER ROLLS AND THE LIKE. Patent dated January 17, 1933. Disclaimer filed November 30, 1935, by the patentee.

Hereby enters this disclaimer to claims 1, 2, and 19 of the aforesaid Letters Patent, which are in the following words:—

"1. In a machine tool for machining rolls of the kind described, the combination of a rotatable table provided with bearings for supporting a pair of rolls to be machined with their axes parallel to one another and to said table, a tool holder carried on the frame of the machine and extending between the pair of rolls so mounted, means for rotating said table, mechanism for rotating each roll about its axis to feed the same to a tool in said holder and mechanism for automatically moving the tool holder in directions transverse to the axis of rotation of the table as the same rotates and for the purpose specified.

"2. In a machine tool for machining rolls of the kind described, the combination of a rotatable table provided with bearings for supporting a pair of rolls to be machined with their axes parallel to one another and to said table, a tool holder movably mounted on the machine frame and extending between the pair of rolls so mounted, means for moving said tool holder radially with respect to said table, means for rotating said table, mechanism for rotating each roll about its axis to feed the same to a tool in said holder and mechanism for moving the tool holder in directions transverse to the axis of rotation of the table as the same rotates, and for the purpose specified."

"19. A method of machining rolls, for example, Pilger rolls, which consists in (a) rotating a pair of rolls having their axes disposed parallel to one another about an axis which extends between the rolls in a direction at right angles to the axes thereof (b) subjecting the rolls as they rotate to cuts across the peripheral faces thereof from a tool located between the rolls, and (c) periodically moving the tool radially with respect to the said axis of rotation of the pair of rolls in such a manner that the cuts are made in accordance with the desired contour of the rolls."

[*Official Gazette January 14, 1936.*]